(12) United States Patent
Norito

(10) Patent No.: US 7,366,599 B2
(45) Date of Patent: Apr. 29, 2008

(54) ELECTRIC POWER STEERING APPARATUS

(75) Inventor: Yasuji Norito, Sakai (JP)

(73) Assignee: JTEKT Corporation, Osaka (JP)

( * ) Notice: Subject to any disclaimer, the term of this patent is extended or adjusted under 35 U.S.C. 154(b) by 677 days.

(21) Appl. No.: 10/751,660

(22) Filed: Jan. 6, 2004

(65) Prior Publication Data

US 2004/0186640 A1    Sep. 23, 2004

(30) Foreign Application Priority Data

Jan. 8, 2003    (JP) .............................. 2003-002470

(51) Int. Cl.
*B62D 6/10* (2006.01)
*B62D 6/00* (2006.01)

(52) U.S. Cl. ......................... 701/42; 701/41; 180/443; 180/446

(58) Field of Classification Search .................. 701/41, 701/42, 43; 180/443, 446, 421, 422, 342
See application file for complete search history.

(56) References Cited

U.S. PATENT DOCUMENTS

| | | | |
|---|---|---|---|
| 6,665,599 B2 * | 12/2003 | Kogiso et al. ................. | 701/41 |
| 6,856,869 B2 * | 2/2005 | Takahashi ..................... | 701/41 |
| 2002/0060538 A1 * | 5/2002 | Hara et al. ................... | 318/432 |
| 2002/0116105 A1 | 8/2002 | Chen et al. | |
| 2002/0149340 A1 * | 10/2002 | Collier-Hallman et al. . | 318/727 |
| 2003/0094330 A1 * | 5/2003 | Boloorchi et al. .......... | 180/446 |
| 2005/0065685 A1 * | 3/2005 | Hamamoto et al. .......... | 701/41 |

FOREIGN PATENT DOCUMENTS

| | | |
|---|---|---|
| DE | 101 64 184 A1 | 7/2002 |
| JP | 9-221046 | 8/1997 |
| JP | 11-180319 | 7/1999 |
| JP | 11-321668 | 11/1999 |
| JP | 2000-108916 | * 4/2000 |
| JP | 2001-39323 | 2/2001 |
| JP | 2002-46630 | 2/2002 |
| JP | 2002-193130 | 7/2002 |

* cited by examiner

*Primary Examiner*—Thomas Black
*Assistant Examiner*—Christine M Behncke
(74) *Attorney, Agent, or Firm*—Rabin & Berdo, P.C.

(57) ABSTRACT

An electric power steering apparatus that performs steering assist by transmitting a driving force produced by an electric motor to a steering mechanism. The apparatus is provided with a current detection circuit for detecting a current flowing through the electric motor to output a motor current detection signal, and a microcomputer for controlling the electric motor on the basis of the motor current detection signal. The current detection circuit has a variable gain amplification circuit, to output the motor current detection signal amplified by the variable gain amplification circuit. The microcomputer has an analog-to-digital conversion port to which the motor current detection signal outputted by the current detection circuit is inputted, to receive the motor current detection signal through the analog-to-digital conversion port. The apparatus is further provided with a gain change section for changing the gain of the variable gain amplification circuit.

5 Claims, 7 Drawing Sheets

ELECTRIC POWER STEERING APPARATUS

BACKGROUND OF THE INVENTION

1. Field of the Invention

The present invention relates to an electric power steering apparatus so configured as to perform steering assist by transmitting a driving force produced by an electric motor to a steering mechanism.

2. Description of Related Art

Conventionally, an electric power steering apparatus that performs steering assist by transmitting torque produced by an electric motor to a steering mechanism in a vehicle has been employed. The electric motor is driven and controlled on the basis of a target current value determined depending on a steering torque applied to a steering wheel and vehicle speed.

In order to carry out feedback control of the electric motor, a current flowing through the electric motor is detected by a current detection circuit. A motor current value detected by the current detection circuit is inputted to an analog-to-digital (A/D) conversion port in a microcomputer. The microcomputer determines a target current value depending on the steering torque and the vehicle speed, and carries out feedback control of the electric motor such that the motor current value coincides with the target current value.

Although the motor current detection circuit comprises an amplification circuit for amplifying a detection signal, the gain of the amplification circuit is generally fixed. Therefore, the detection resolution of a motor current becomes a fixed value throughout a detection range. For example, the resolution in a case where the A/D conversion resolution of the microcomputer is 10 bits (0~1023), and the detection range of the motor current is 50 amperes is a fixed value of 50/1023 amperes throughout the detection range.

However, when the steering torque is small, so that the motor current is very small, the steering wheel is considered to be lightly steered. Accordingly, even a very small change in the motor current becomes the change in the steering torque which is easily felt by a driver.

If a high-resolution analog-to-digital (A/D) converter is used, therefore, fine control can be carried out. Correspondingly, it is considered that a steering feeling can be improved. However, the high-resolution A/D converter and a microcomputer equipped therewith are high in cost. Moreover, in a case where the large steering torque is applied so that the motor current is large, the driver applies a large force to the steering wheel. Accordingly, the driver does not mind a very small change in the motor current. Consequently, the use of the high-resolution A/D converter is not so preferable in terms of cost efficiency.

On the other hand, in Japanese Unexamined Patent Publication (KOKAI) No. 2002-46630, A, for example, it is proposed that a motor current is detected using a current detection circuit having two amplification circuits for amplifying a detection signal with different amplification factors. In the prior art, output signals of the two amplification circuits are respectively inputted to two A/D conversion ports in a microcomputer. The microcomputer controls an electric motor by referring to an input signal of the A/D conversion port which receives the signal from the amplification circuit having a high amplification factor when the motor current is small, while controlling the electric motor on the basis of the detection signal received from the A/D conversion port corresponding to the amplification circuit having a low amplification factor when the motor current is large.

Consequently, the motor current can be detected with a high detection resolution in an area where the motor current is very small. Accordingly, a steering feeling in a case where the motor current is very small can be improved.

In the above-mentioned configuration, however, the current detection circuit needs the two amplification circuits. Therefore, the cost of the current detection circuit is increased. Further, the output signals of the two amplification circuits are respectively inputted to the two A/D conversion ports in the microcomputer. Therefore, the microcomputer must be equipped with a lot of A/D conversion ports and the cost thereof is increased accordingly. Further, a plurality of amplification circuits and a plurality of A/D conversion ports are employed. In order to ensure the relative precision of read values, therefore, constant adjustment is required.

SUMMARY OF THE INVENTION

An object of the present invention is-to provide an electric power steering apparatus capable of detecting a motor current in an electric motor with a suitable resolution in a low-cost configuration and therefore, capable of realizing good steering assist.

The present invention relates to an electric power steering apparatus that performs steering assist by transmitting a driving force produced by an electric motor to a steering mechanism. The apparatus comprises a current detection circuit for detecting a current flowing through an electric motor to output a motor current detection signal, and a microcomputer for controlling the electric motor on the basis of the motor current detection signal. The microcomputer has an A/D conversion port to which the motor current detection signal outputted by the current detection circuit is inputted. The current detection circuit comprises a variable gain amplification circuit whose gain can be changed, to output the motor current detection signal amplified by the variable gain amplification circuit. The electric power steering apparatus further comprises a gain change section for changing the gain of the variable gain amplification circuit.

According to the present invention, the current detection circuit comprises the variable gain amplification circuit whose gain can be changed, and the motor current detection signal amplified by the variable gain amplification circuit is inputted to the A/D conversion port in the microcomputer. If the gain of the variable gain amplification circuit is changed by the gain change section, therefore, the motor current can be detected with different resolutions using one amplification circuit and one A/D conversion port.

Consequently, the motor current can be detected with a suitable resolution even in a low-cost configuration, thereby making it possible to realize a good steering feeling.

The variable gain amplification circuit may be one whose gain can be switched between a first gain and a second gain smaller than the first gain. In this case, the gain change section switches the gain of the variable gain amplification circuit between the first gain and the second gain.

The gain change section may be one that determines the gain of the variable gain amplification circuit such that the smaller a motor current represented by the motor current detection signal received from the A/D conversion port is, the larger the gain is.

According to this configuration, the smaller the motor current is, the larger the gain of the variable gain amplification circuit is determined to be. Consequently, the small motor current can be detected with a high resolution. Accordingly, the control of the electric motor in a small current range can be satisfactorily carried out. As a result, a steering feeling can be improved.

When the variable gain amplification circuit is one whose gain can be switched between the first gain and the second gain smaller than the first gain, it is preferable that the gain change section determines the gain of the variable gain amplification circuit as the first gain when the motor current is not more than a predetermined value, while determining the gain of the variable gain amplification circuit as the second gain when the motor current exceeds the predetermined value.

It is preferable that the electric power steering apparatus further comprises a steering torque sensor for sensing a steering torque applied to an operation member for steering a vehicle. In this case, it is preferable that the microcomputer determines a target current value corresponding to the steering torque sensed by the steering torque sensor, and carries out feedback control of the electric motor such that the motor current detection signal received from the A/D conversion port coincides with the target current value. Further, it is preferable that the gain change section determines the gain of the variable gain amplification circuit such that the smaller the absolute value of the steering torque sensed by the steering torque sensor is, the larger the gain is.

According to this configuration, the gain of the variable gain amplification circuit is changed depending on the steering torque. The larger the absolute value of the steering torque is, the larger the target current value is determined to be. Correspondingly, the motor current value in this case is increased. Therefore, the gain change section determines the gain of the variable gain amplification circuit such that the smaller the absolute value of the steering torque is, the larger the gain is. Consequently, the small motor current can be detected with a high resolution. Accordingly, the electric motor can be satisfactorily controlled, thereby realizing a superior steering feeling.

When the variable gain amplification circuit is one whose gain can be switched between the first and second gains, it is preferable that the gain change section determines the gain of the variable gain amplification circuit as the first gain when the absolute value of the steering torque sensed by the steering torque sensor is not more than a predetermined value, while determining the gain of the variable gain amplification circuit as the second gain when the absolute value of the steering torque exceeds the predetermined value.

The electric power steering apparatus may further comprise a steering torque sensor for sensing a steering torque applied to an operation member for steering a vehicle, and a vehicle sensor for sensing the vehicle speed of a vehicle. In this case, it is preferable that the microcomputer determines a target current value corresponding to the steering torque sensed by the steering torque sensor and the vehicle speed sensed by the vehicle speed sensor, and carries out feedback control of the electric motor such that the motor current detection signal received from the A/D conversion port coincides with the target current value. Further, it is preferable that the gain change section is one that determines the gain of the variable gain amplification circuit such that the higher the vehicle speed sensed by the vehicle speed sensor is, the larger the gain is.

In this configuration, so-called vehicle speed adaptive control is carried out. That is, a large steering assist force is required at the time of low-speed traveling and at the time of a stop, while a small steering assist force is required at the time of intermediate-speed traveling and at the time of high-speed traveling. That is, the target current value is determined to be smaller at the time of higher-speed traveling. The gain change section determines the gain of the variable gain amplification circuit such that the higher the vehicle speed is, the larger the gain is, and detects the small motor current value with a high resolution. Consequently, the electric motor can be satisfactorily controlled, thereby making it possible to improve a steering feeling.

In a case where the variable gain amplification circuit is one whose gain can be switched between the first and second gains, it is preferable that the gain change section determines the gain of the variable gain amplification circuit as the second gain when the vehicle speed sensed by the vehicle speed sensor is not more than a predetermined value, while determining the gain of the variable gain amplification circuit as the first gain when the vehicle speed exceeds the predetermined value.

The gain change section may be a functional processing means realized by program processing executed by a microcomputer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
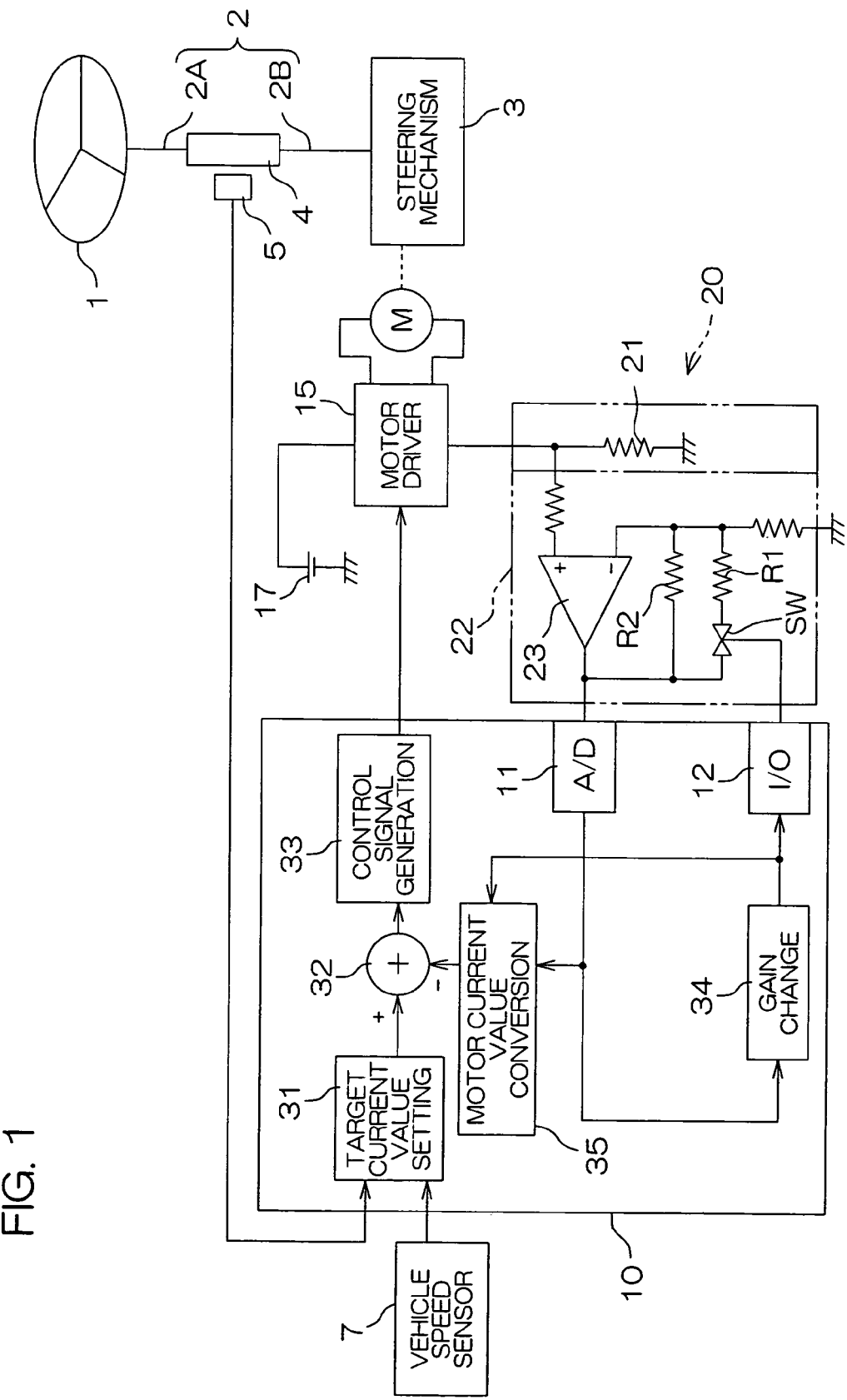
FIG. 1 is a block diagram showing the electrical configuration of an electric power steering apparatus according to a first embodiment of the present invention.

FIG. 1 is a block diagram showing the electrical configuration of an electric power steering apparatus according to a first embodiment of the present invention. A steering torque applied to a steering wheel 1 serving as an operation member is mechanically transmitted to a steering mechanism 3 through a steering shaft 2. A steering assist force is transmitted to the steering mechanism 3 from an electric motor M.

The steering shaft 2 is divided into an input shaft 2A coupled to the steering wheel 1 and an output shaft 2B coupled to the steering mechanism 3. The input shaft 2A and the output shaft 2B are connected to each other by a torsion bar 4. The torsion bar 4 causes distortion depending on the steering torque. The direction and the amount of the distortion are sensed by a torque sensor 5.

The torque sensor 5 is composed of a magnetic type torque sensor, for example, for sensing a magnetoresistance which changes depending on the change in the positional relationship in the direction of rotation between the input shaft 2A and the output shaft 2B. An output signal of the torque sensor 5 is inputted to a microcomputer 10.

An output signal of a vehicle speed sensor 7 for sensing the vehicle speed of the vehicle equipped with the electric power steering apparatus is further inputted to the microcomputer 10.

The microcomputer 10 determines a target current value of the electric motor M depending on the steering torque sensed by the torque sensor 5 and the vehicle speed sensed by the vehicle speed sensor 7, to control a motor driver 15 for supplying power to the electric motor M such that a steering assist force corresponding to the steering torque or the like is applied to the steering mechanism 3.

Power from an on-vehicle battery 17 is supplied to the motor driver 15. The motor driver 15 is composed of a bridge circuit of power MOS (Metal Oxide Semiconductor) field effect transistors, for example. The power MOS field effect transistors are switched by control signals (e.g., PWM (Pulse Width Modulation) control signals) fed from the microcomputer 10.

A current detection circuit 20 for detecting a current flowing through the electric motor M is provided in association with the motor driver 15. An output signal of the current detection circuit 20 is inputted to an analog-to-digital (A/D) conversion port 11 (e.g., one comprising a 10-bit A/D converter) in the microcomputer 10.

The current detection circuit 20 has a resistor for current detection 21 connected between the motor driver 15 and the ground, and a variable gain amplification circuit 22 for amplifying a voltage between terminals of the resistor for current detection 21 to generate a motor current detection signal (an analog signal). The variable gain amplification circuit 22 forms a negative feedback amplification circuit having its output signal fed back to an inverted input terminal of a differential amplifier 23. A feedback resistance across the differential amplifier 23 comprises a resistor R2 and a series circuit connecting a resistor R1 and an analog switch SW in series. The resistor R2 and the series circuit are connected in parallel to form the feedback resistance. The negative feedback resistance is changed by turning the analog switch SW on and off. Consequently, the gain of the amplification circuit 22 is switched between a first gain G1 and a second gain G2 (<G1).

A control terminal of the analog switch SW is connected to an output port 12 in the microcomputer 10. On-off control of the analog switch SW is carried out by the microcomputer 10 so that the gain of the variable gain amplification circuit 22 can be changed.

The microcomputer 10 substantially has a plurality of functional processing sections realized by executing program processing. Specifically, the microcomputer 10 comprises a target current value setting section 31 for setting a target current value of the electric motor M on the basis of the outputs of the torque sensor 5 and the vehicle speed sensor 7, a deviation operation section 32 for finding deviation between the target current value set by the target current value setting section 31 and a motor current value received from the A/D conversion port 11, a control signal generation section 33 for generating the motor control signals (e.g., PWM control signals) for controlling the motor driver 15 on the basis of the deviation found by the deviation operation section 32, a gain change section 34 for outputting a control signal for turning the analog switch SW on and off from the output port 12 on the basis of the motor current value received from the A/D conversion port 11, and a motor current value conversion section 35 for converting the motor current value received from the A/D conversion port 11 so as to compensate for (normalize) the change in gain by the gain change section 34. The motor current value which has been converted by the motor current value conversion section 35 is fed to the deviation operation section 32, to be an object of deviation operation from the target current value.

Figure 2:
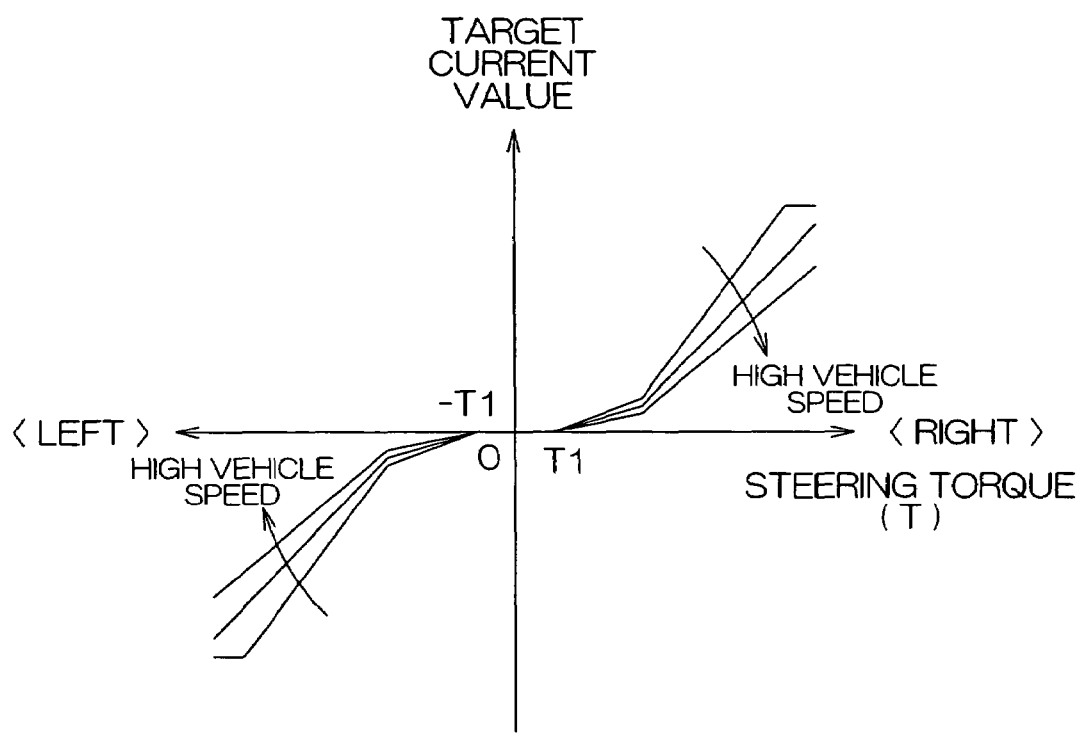
FIG. 2 is a diagram for explaining the function of a target current value setting section, where the relationship between a steering torque and a target current value (assist characteristics) is illustrated.

FIG. 2 is a diagram for explaining the function of the target current value setting section 31, where the relationship between the steering torque and the target current value (assist characteristics) is illustrated. As an example of the steering torque, a torque for steering in the rightward direction takes a positive value, and a torque for steering in the leftward direction takes a negative value. The target current value is a positive value when a steering assist force for steering in the rightward direction should be produced from the electric motor M, while being a negative value when a steering assist force for steering in the leftward direction should be produced from the electric motor M.

The target current value is a positive value with respect to the positive value of the steering torque, while being a negative value with respect to the negative value of the steering torque. When the steering torque is a very small value in a range of −T1 to T1 (a torque insensitive zone or dead zone), the target current value is zero. The target current value is so set that the higher the vehicle speed sensed by the vehicle speed sensor 7 is, the smaller the absolute value of the target current value is. Consequently, a large steering assist force can be produced at the time of low-speed traveling, while the steering assist force can be reduced at the time of high-speed traveling.

Figure 3A:
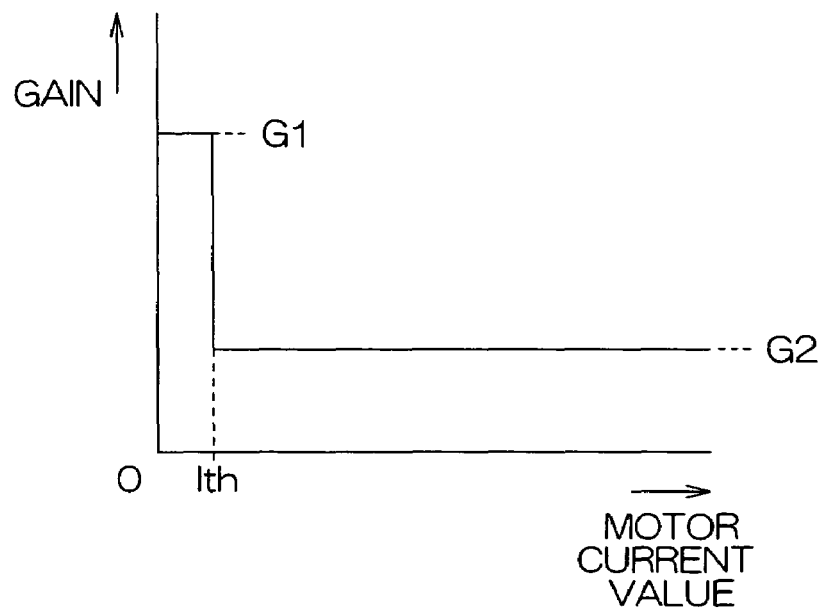
FIGS. 3(a) and 3(b) are characteristic views for explaining the function of a gain change section.
Figure 3B:
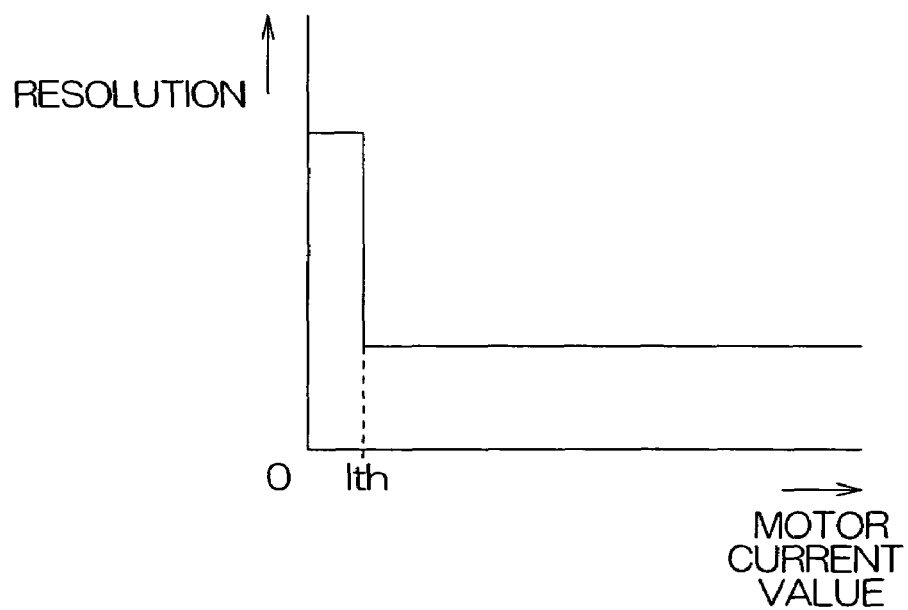

FIGS. 3(a) and 3(b) are characteristic views for explaining the function of the gain change section 34, where FIG. 3(a) shows the relationship between the motor current value received from the A/D conversion port 11 and the gain of the variable gain amplification circuit 22 changed by turning the analog switch SW on and off, and FIG. 3(b) shows the relationship between the motor current value and the detection resolution of the motor current.

As shown in FIG. 3(a), the gain change section 34 sets the gain of the variable gain amplification circuit 22 to a relatively large first gain G1 in a range where the motor current value is not more than a predetermined threshold value Ith. On the other hand, the gain change section 34 sets the gain of the variable gain amplification circuit 22 to a relatively small second gain G2 in a range where the motor current value exceeds the predetermined threshold value Ith.

Therefore, as shown in FIG. 3(b), the motor current is detected with a large detection resolution with respect to the motor current value which is not more than the threshold value Ith, while being detected with a relatively small detection resolution with respect to the motor current value which exceeds the threshold value Ith.

The motor current value conversion section 35 converts the digital value from the A/D conversion port 11 depending on the gain set by the gain change section 34, while generating a motor current value by which the change in gain in the variable gain amplification circuit 22 is compensated for.

The microcomputer 10 itself changes the gain of the variable gain amplification circuit 22. Although motor current detection signals amplified at different gains are received from the one A/D conversion port 11, therefore, the received motor current detection value can be suitably processed.

According to the present embodiment, therefore, the motor current can be detected with a high resolution in a small current area using the one variable gain amplification circuit 22 and the one A/D conversion port 11. On the other hand, the gain of the variable gain amplification circuit 22 is made low in a large current area. Accordingly, a high-resolution A/D converter is not required. Consequently, the current detection circuit 20 can be configured at low cost. Further, the necessity of using, as the microcomputer 10, an expensive one comprising a high-resolution A/D conversion port or a lot of A/D conversion ports is eliminated. As a result, the motor current can be detected accurately in the low-cost configuration. The electric motor M is controlled on the basis of the motor current accurately detected, thereby making it possible to realize a superior steering feeling.

Figure 4:
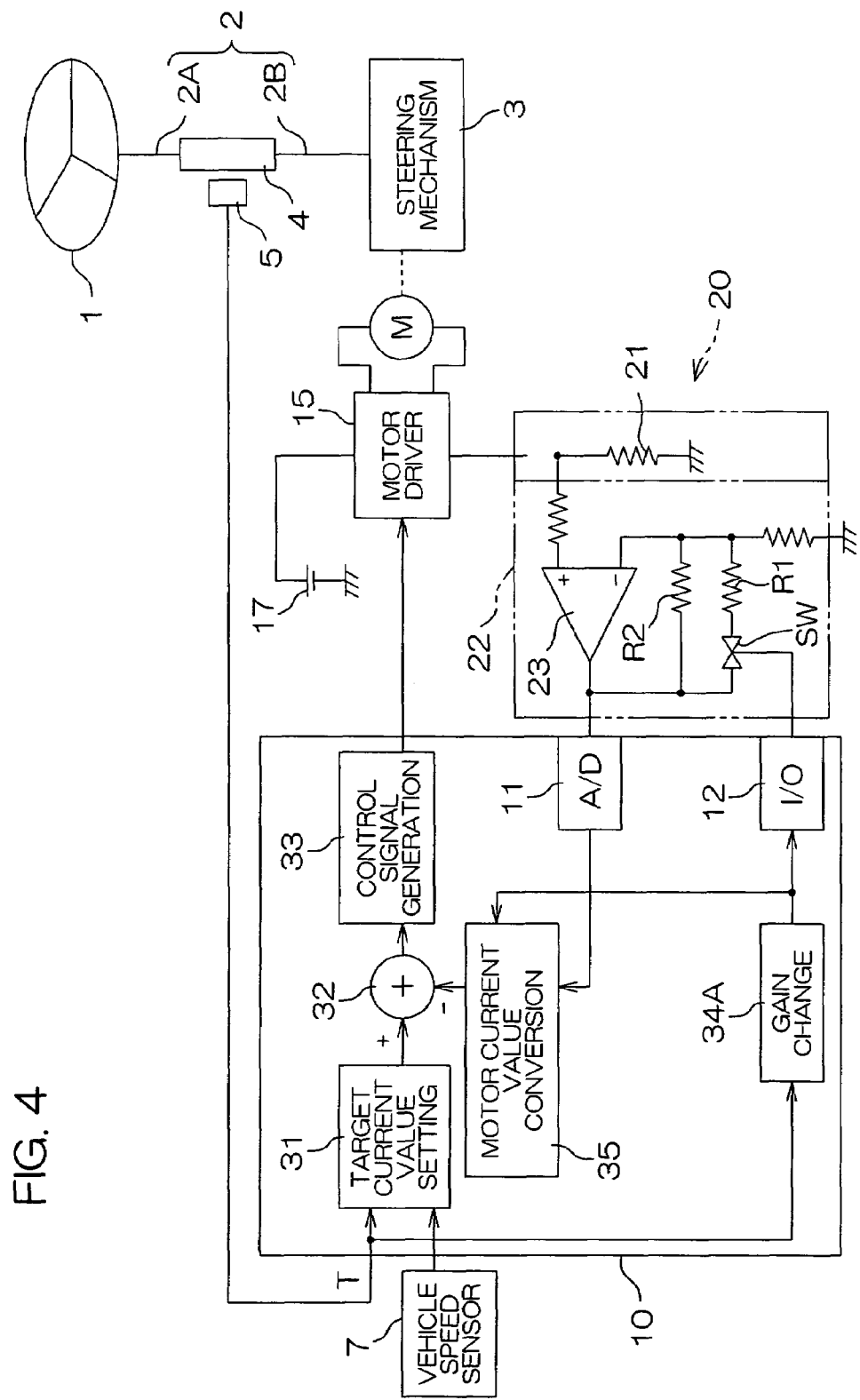
FIG. 4 is a block diagram for explaining the configuration of an electric power steering apparatus according to a second embodiment of the present invention.

FIG. 4 is a block diagram for explaining the configuration of an electric power steering apparatus according to a second embodiment of the present invention. In FIG. 4, sections corresponding to the above-mentioned sections shown in FIG. 1 are assigned the same reference numerals as those shown in FIG. 1. In the present embodiment, a gain change section 34A switches the gain of a variable gain amplification circuit 22 on the basis of the absolute value of a steering torque T. A command to switch the gain is also given to a motor current value conversion section 35.

Figure 5:
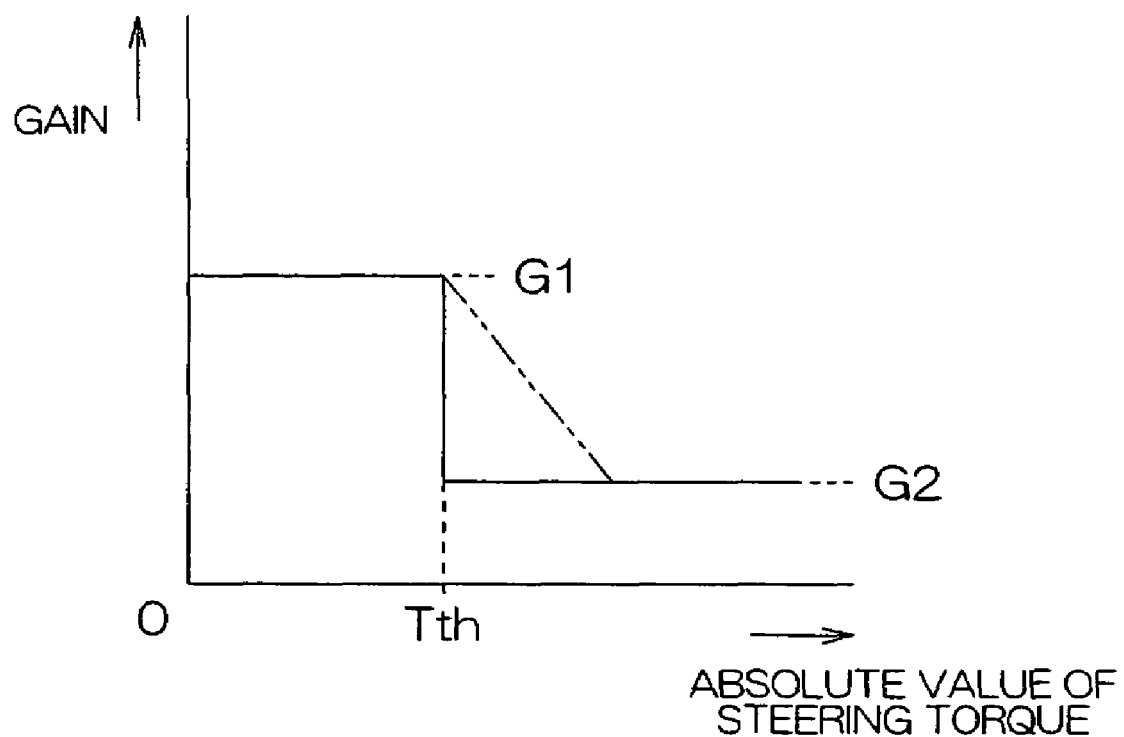
FIG. 5 is a diagram for explaining the function of a gain change section in the second embodiment.

FIG. 5 is a diagram for explaining the function of the gain change section 34A, where the relationship between the absolute value of the steering torque T and the gain of the variable gain amplification circuit 22 is illustrated. As shown in FIG. 2, described above, the absolute value of a target current value is small in a range where the absolute value of the steering torque T is small. Correspondingly, a motor current also takes a small value. Therefore, the gain change section 34A sets the gain of the variable gain amplification circuit 22 to a relatively large first gain G1 when the absolute value |T| of the steering torque is not more than a predetermined threshold value Tth (>0). On the other hand, the gain change section 34A switches the gain of the variable gain amplification circuit 22 to a relatively small second gain G2 when the absolute value |T| of the steering torque exceeds the predetermined threshold value Tth.

When the motor current is very small, therefore, the motor current can be detected with a high resolution, thereby making it possible to achieve the same effect as that in the above-mentioned first embodiment.

Figure 6:
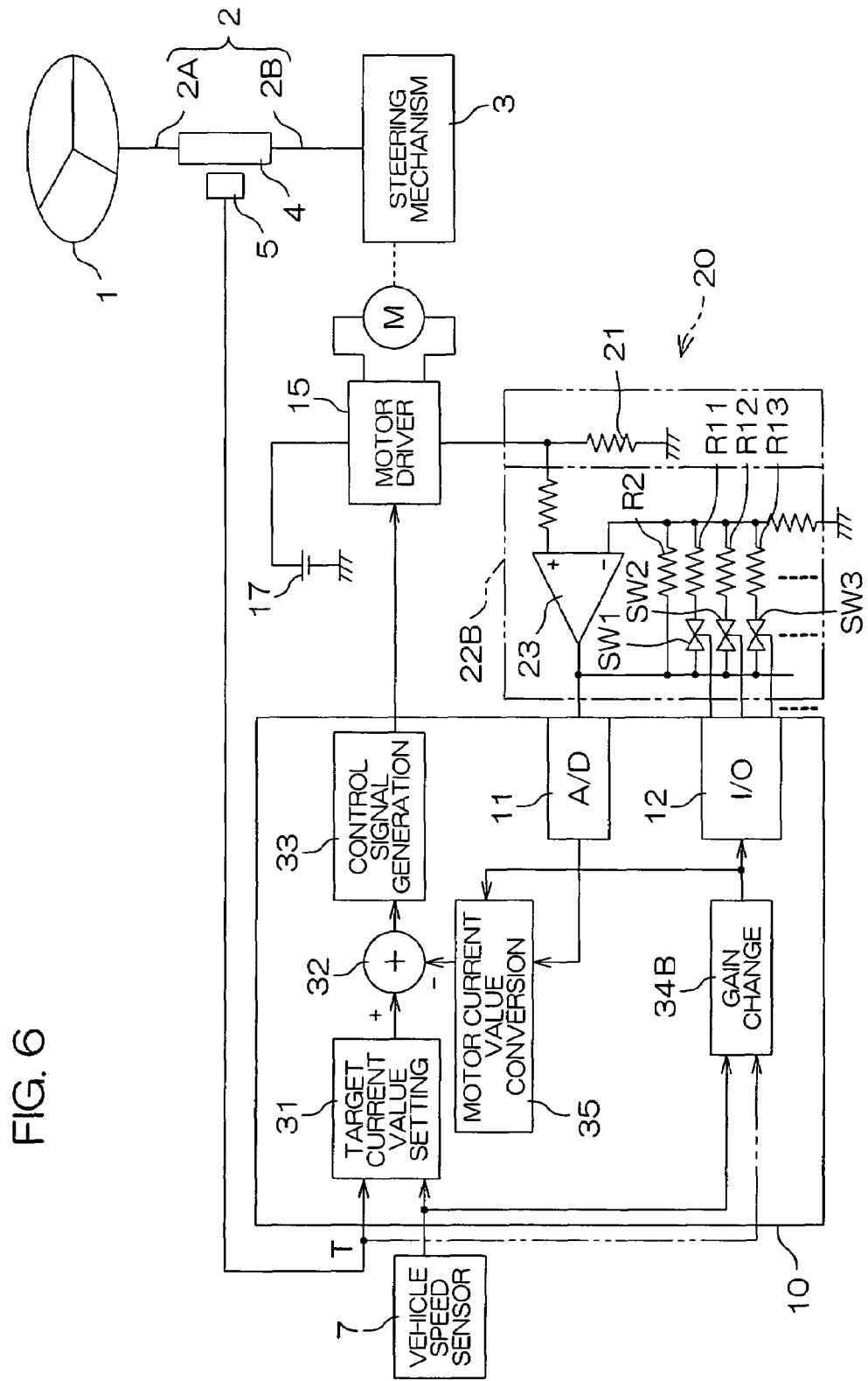
FIG. 6 is a block diagram for explaining the configuration of an electric power steering apparatus according to a third embodiment of the present invention.

FIG. 6 is a block diagram for explaining the configuration of an electric power steering apparatus according to a third embodiment of the present invention. In FIG. 6, sections corresponding to the sections shown in FIG. 1, described above, are assigned the same reference numerals as those shown in FIG. 1.

In the present embodiment, in a variable gain amplification circuit 22B provided in a current detection circuit 20, a negative feedback resistance across a differential amplifier 23 comprises a resistor R2 and a plurality of series circuits respectively connecting analog switches SW1, SW2, ... and resistors R11, R12, ... in series. The resistor R2 and the plurality of series circuits are connected in parallel to form the negative feedback resistance. Consequently, the gain of the variable gain amplification circuit 22B can be changed into three or more types of gains by carrying out on-off control of the analog switches SW1, SW2, ....

On the other hand, a gain change section 34B provided in a microcomputer 10 switches the gain of the variable gain amplification circuit 22B on the basis of a vehicle speed V received from a vehicle speed sensor 7. A command to switch the gain is also given to a motor current value conversion section 35.

Figure 7:
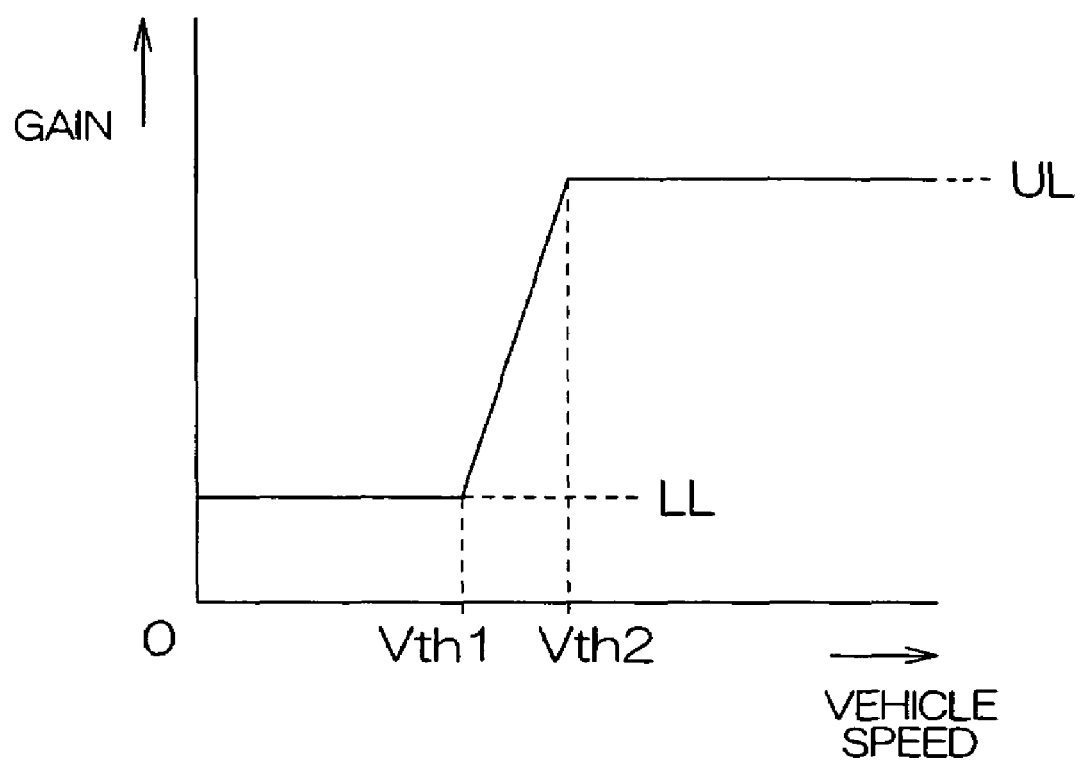
FIG. 7 is a diagram for explaining the function of a gain change section in the third embodiment.

FIG. 7 is a diagram for explaining the function of the gain change section 34B. The gain change section 34B sets the gain of the variable gain amplification circuit 22B to a lower-limit gain value LL in a low-speed area where the vehicle speed V is not more than a predetermined threshold value Vth1 (e.g., Vth1=10 km/h), while setting the gain of the variable gain amplification circuit 22B to an upper-limit gain value UL in intermediate-speed and high-speed areas where the vehicle speed V is not less than another threshold value Vth2 (e.g., Vth2=50 km/h). When the vehicle speed V takes a value within a transition zone between the threshold values Vth1 and Vth2, the gain of the variable gain amplification circuit 22B is variably set such that it is linearly increased from the lower-limit gain value LL to the upper-limit gain value UL in accordance with the increase in the vehicle speed V.

As shown in FIG. 2, described above, the higher the vehicle speed V becomes, the smaller the target current value becomes. Correspondingly, the motor current value is also reduced. According to the present embodiment, therefore, a small motor current value can be detected with a high resolution, thereby making it possible to produce the same effect as those in the cases of the above-mentioned first and second embodiments.

In FIG. 6, the gain change section 34B may be one for variably setting the gain of the variable gain amplification circuit 22B on the basis of both the absolute value |T| of the steering torque and the vehicle speed V, as indicated by a two-dot and dash line. That is, the gain may be determined such that the larger the absolute value |T| of the steering torque is, the smaller the gain is, and the higher the vehicle speed is, the larger the gain is, as indicated by a two-dot and dash line in FIG. 5.

Although description has been made of the three embodiments of the present invention, the present invention can also be embodied in other embodiments. For example, the present invention may be embodied such that the smaller the target current value set by the target current value setting section 31 is, the larger the gain of the variable gain amplification circuit becomes.

Although the present invention has been described and illustrated in detail, it is clearly understood that the same is by way of illustration and example only and is not to be taken by way of limitation, the spirit and scope of the present invention being limited only by the terms of the appended claims.

The present application corresponds to an application NO. 2003-2470 filed with the Japanese Patent Office on Jan. 8, 2003, the disclosure of which is incorporated herein by reference.

What is claimed is:

1. An electric power steering apparatus that performs steering assist by transmitting a driving force produced by an electric motor to a steering mechanism, comprising:

a current detection circuit for detecting a current flowing through the electric motor to output a motor current detection signal, the current detection circuit including a variable gain amplification circuit whose gain can be changed, the current detection circuit outputting the motor current detection signal amplified by the variable gain amplification circuit; and a microcomputer, having an analog-to-digital conversion port to which the motor current detection signal outputted by the current detection circuit is inputted and also having a gain change section for changing the gain of the variable gain amplification circuit, for controlling the electric motor on the basis of the received motor current detection signal through the analog-to-digital conversion port, wherein the gain change section determines the gain of the variable gain amplification circuit such that the smaller a motor current represented by the motor current detection signal received from the analog-to-digital conversion port is, the larger the gain is.

2. The electric power steering apparatus according to claim 1, wherein the microcomputer additionally has a motor current value conversion section that converts a digital value from the analog-to-digital conversion port depending on the gain determined by the gain change section, and generates a motor current value in which the change in gain in the variable gain amplification circuit is compensated for.

3. An electric power steering apparatus that performs steering assist by transmitting a driving force produced by an electric motor to a steering mechanism, comprising:

a current detection circuit for detecting a current flowing through the electric motor to output a motor current detection signal, the current detection circuit including a variable gain amplification circuit whose gain can be changed, the current detection circuit outputting the motor current detection signal amplified by the variable gain amplification circuit;

a microcomputer, having an analog-to-digital conversion port to which the motor current detection signal outputted by the current detection circuit is inputted and also having a gain change section for changing the gain of the variable gain amplification circuit, for controlling the electric motor on the basis of the received motor current detection signal through the analog-to-digital conversion port;

a steering torque sensor for sensing the steering torque applied to an operation member for steering a vehicle, wherein the microcomputer determines a target current value corresponding to the steering torque sensed by the steering torque sensor, and carries out feedback control of the electric motor such that the motor current detection signal received from the analog-to-digital conversion port coincides with the target current value, and wherein the gain change section determines the gain of the variable gain amplification circuit such that the smaller the absolute value of the steering torque sensed by the steering torque sensor is, the larger the gain is.

4. The electric power steering apparatus according to claim 3, wherein the microcomputer additionally has a motor current value conversion section that converts a digital value from the analog-to-digital conversion port depending on the gain determined by the gain change section, and generates a motor current value in which the change in gain in the variable gain amplification circuit is compensated for.

5. A electric power steering apparatus, that performs steering assist by transmitting a driving force produced by an electric motor to a steering mechanism, comprising:

a current detection circuit for detecting a current flowing through the electric motor to output a motor current detection signal, the current detection circuit including a variable gain amplification circuit whose gain can be changed, the current detection circuit outputting the motor current detection signal amplified by the variable gain amplification circuit;

a microcomputer, having an analog-to-digital conversion port to which the motor current detection signal outputted by the current detection circuit is inputted and also having a gain change section for changing the gain of the variable gain amplification circuit, for controlling the electric motor on the basis of the received motor current detection signal through the analog-to-digital conversion port;

a steering torque sensor for sensing a steering torque applied to an operation member for steering a vehicle, and a vehicle speed sensor for sensing the vehicle speed of a vehicle, wherein the microcomputer determines a target current value corresponding to the steering torque sensed by the steering torque sensor and the vehicle speed sensed by the vehicle speed sensor, and carries out feedback control of the electric motor such that the motor current detection signal received from the analog-to-digital conversion port coincides with the target current value, wherein the microcomputer additionally has a motor current value conversion section that converts a digital value from the analog-to-digital conversion port depending on the gain determined by the gain change section, and generates a motor current value in which the change in gain in the variable gain amplification circuit is compensated for, and wherein the gain change section determines the gain of the variable gain amplification circuit such that the higher the vehicle speed sensed by the vehicle speed sensor is, the larger the gain is.

* * * * *